(12) United States Patent
Cocker

(10) Patent No.: US 6,425,423 B1
(45) Date of Patent: Jul. 30, 2002

(54) CONTAINMENT DEVICE

(75) Inventor: Neil Cocker, South Yorkshire (GB)

(73) Assignee: Extract Technology Limited, Huddersfield (GB)

( * ) Notice: Subject to any disclaimer, the term of this patent is extended or adjusted under 35 U.S.C. 154(b) by 0 days.

(21) Appl. No.: 09/814,457

(22) Filed: Mar. 22, 2001

(30) Foreign Application Priority Data

Mar. 23, 2000 (GB) .............................................. 0007024

(51) Int. Cl.$^7$ .............................. B65B 1/04; B65B 3/04; B67C 3/02

(52) U.S. Cl. .......................... 141/97; 141/59; 141/285; 141/347; 141/383

(58) Field of Search ............................... 141/59, 65, 67, 141/97, 251, 256, 263, 275, 276, 285, 346, 347, 364, 365, 383, 386

(56) References Cited

U.S. PATENT DOCUMENTS

| | | | |
|---|---|---|---|
| 4,061,221 A | | 12/1977 | Higashinaka et al. |
| 4,969,494 A | | 11/1990 | Chefson |
| 5,490,546 A | * | 2/1996 | Lhoest ........................ 141/346 |
| 5,746,258 A | * | 5/1998 | Huck ........................... 141/67 |
| 5,782,277 A | * | 7/1998 | Ung ............................ 141/352 |
| 6,024,141 A | * | 2/2000 | Wegman ...................... 141/59 |
| 6,269,852 B1 | * | 8/2001 | Muhr .......................... 141/287 |

* cited by examiner

Primary Examiner—Timothy L. Maust
(74) Attorney, Agent, or Firm—Sullivan Law Group

(57) ABSTRACT

A device for localized containment of extraneous material at and in the vicinity of the interface between a material receiving body (e.g., a reaction vessel) and a material dispensing body (e.g., a powder bin). The device includes a containment chamber and a ventilation system for ventilating the interior of the containment chamber whereby extraneous material at and in the vicinity of the interface between the material receiving body and the material dispensing body is transported to a remote location.

47 Claims, 17 Drawing Sheets

Velocity Vectors Coloured By Velocity Magnitude (m/s)

Contours of Turbulent Viscosity (kg/m-s)

Contours of Static Pressure (pascal)

Velocity Vectors Coloured By Velocity Magnitude (m/s)

Contours of Turbulent Viscosity (kg/m-s)

Contours of Dynamic Pressure (pascal)

Velocity Vectors Coloured By Velocity Magnitude (m/s)

Contours of Static Pressure (pascal)

Velocity Vectors Coloured By Velocity Magnitude (m/s)

Contours of Turbulent Viscosity (kg/m-s)

Contours of Static Pressure (pascal)

CONTAINMENT DEVICE

The benefit of priority is claimed based on UK Patent Application No. 0007024.3 filed on Mar. 23, 2000, the complete disclosure of which is incorporated herein by reference.

BACKGROUND OF THE INVENTION

1. Field of the Invention

The present invention relates to a device (e.g., an extraction hood) for localised containment of extraneous powdered material (e.g., powdered pharmaceutical materials) in a material transfer apparatus.

2. Description of the Related Art

In the field of material transfer technology, it is known to transfer material between a material supply means (e.g., a powder bin) and a material receiving means (e.g., a reaction vessel) using a valve-operated device. A number of valve-operated devices are known.

A basic butterfly valve comprises a simple flap ("the butterfly") which is rotatable about an axis to increase or decrease the cross-sectional area of an aperture whereby to control the material flow rate between material supply means and material receiving means. The basic butterfly valve is appropriate for a fixed processing arrangement but is unsatisfactory for transfer between discrete material supply means and material receiving means. This has led to the development of the split butterfly valve in which the valve is split through the butterfly in a direction perpendicular to its longitudinal axis. Thus, the split butterfly valve comprises two discrete parts, a first part secured to the material supply means and a second part secured to the material receiving means, each of which permits containment of material in a material supply means or a material receiving means to which the respective part is secured. In use, the split butterfly valve permits the discrete material supply means and material receiving means to be mechanically docked (see FIG. 1) and thereafter operates as a normal fixed valve by controlling material flow rate across the interface. Thus, with reference to FIG. 1(a), the split butterfly valve is shown with the two parts separated and with the material supply means isolated from the material receiving means. In FIG. 1(b), the respective parts of the split butterfly valve are mechanically docked and the butterfly remains closed to contain the material in the respective means. In FIG. 1(c), the butterfly valve is opened to allow material to flow across the valve interface. After transfer is complete, the parts are closed to re-isolate the material supply means from the material receiving means and are mechanically undocked.

During the transfer of potentially toxic materials, there is in general a need to provide a safe and contained local environment at and in the vicinity of the interface of the material supply means (e.g., a powder bin) and the material receiving means (e.g., a chemical reaction vessel). Current operating parameters and acceptable operator exposure levels have increased the need to address certain performance inadequacies of devices such as split butterfly valves during material transfer.

A particular disadvantage of the split butterfly valve is observed when material transfer is complete and the two parts of the valve are closed and undocked. During the transfer process, the edge faces of the open valve are exposed to extraneous material. Furthermore, extraneous material may become entrained on the split joint faces and is exposed when the valve is closed and the two parts are undocked. It will be appreciated that this type of exposure to extraneous material represents a hazard to operators, in particular where the extraneous material is of a toxic nature. It will also be appreciated that cleaning of the apparatus in the open air (i.e., outside a contained environment) is hazardous, e.g., airborne exposure and exposure through handling of cleaning wipes, etc.

Fine powders are capable of being suspended in the local working environment where they may be inhaled by operators with potentially disastrous consequences. In handling dangerous and potentially toxic powdered products, it is imperative that a safe breathing zone is provided for the operator which falls within current acceptable levels of exposure (e.g., within a magnitude of micrograms per cubic meter).

OBJECTS OF THE INVENTION

The invention seeks to address the present needs by providing a containment device which reduces the tendency for extraneous material to escape into the working environment of a material transfer apparatus. In particular, the present invention seeks to overcome the impracticality of completely sealing the environment in and around a material transfer apparatus by providing a device for localised containment which greatly improves the safety aspects of the material transfer apparatus and lowers the risk of material contamination.

SUMMARY OF THE INVENTION

According to one aspect the present invention, a device is provided for localised containment of extraneous material at and in the vicinity of the interface between a material receiving means and a material dispensing means. The device comprises a container having a containment chamber. The containment chamber has a first open end adapted to receive at least a part of the material dispensing means, a second open end adapted to receive at least a part of the material receiving means, and an air inlet. The device further comprises means for ventilating the interior of the containment chamber whereby extraneous material at and in the vicinity of the interface between the material receiving means and the material dispensing means is transported to a remote location.

Added to the advantages of increased operator safety achievable by minimizing the risk of exposure to extraneous material, the device of the invention also minimizes the risk of material contamination. In the pharmaceutical industry, this is important in enabling the industry's strict cleanliness and hygiene codes to be met. The device advantageously removes the majority of airborne particulates which might otherwise may be entrained into the material receiving means.

The device of the invention may be adapted to control the flow characteristics and air quality at and in the vicinity of the interface between the material receiving means and the material dispensing means using forced ventilation. Traditionally, forced ventilation falls into three main categories:

1. Up flow of the surrounding air at a velocity which captures the contaminants and carries them along with the air flow and subsequently into a filtration system before being exhausted to atmosphere. Exhaust is accomplished at high level relative to the contaminant source.

2. Down flow of the surrounding air which draws contaminants to a level below that of the typical operators breathing zone. Exhaust is usually accomplished at low level relative to the contaminant source.

3. Cross flow of the surrounding air at an appropriate capture velocity which evacuates contaminants in a horizontal plane. Exhaust and filtration systems may be set at any level when using this technique.

Whilst each forced ventilation system may be used in the device of the invention and has particular advantages and disadvantages, the device is preferably adapted to provide cross flow ventilation. Although it is generally the most difficult system to adopt, cross flow avoids contamination of horizontal upper or lower surfaces which might otherwise occur with vertical air flow (ie up flow or down flow). In other words, it lowers the risk of fallout and settling of powdered particulates and helps to maintain the recommended safe environmental conditions of the operator's breathing zone and of the operator working area in general.

In adopting the cross flow method (or any other ventilation method), it will be within the capabilities of the man skilled in the art to optimise particulate capture velocities, control the characteristics of the air flow and ensure clean working zones. For example, the free volumetric space through which the forced airflow is channelled may be balanced with the size of the air inlet aperture and the exhaust ducting. Air flow may be induced by any available means (e.g., a fan fitted in-line with an exhaust outlet).

In a preferred embodiment, the interface between a material receiving means and a material dispensing means may be provided with means for controlling the material flow rate. The means for controlling the material flow rate may be positioned at or near to the second end of the containment chamber. The means for controlling the material flow rate may be positioned on or near to the central axis of the containment chamber. Preferably the means for controlling the material flow rate is positioned in a plane substantially normal to the axis of the containment chamber (e.g., the horizontal plane), particularly preferably the normal plane lies in the effective flow path of the cross-flow air.

In a preferred embodiment, the means for controlling the material flow rate is a valve (e.g., a butterfly valve). Preferably the valve is a two-part valve capable of controlling material flow rate between the material dispensing means and the material receiving means. Particularly preferably the two-part valve comprises a first part secured to the material dispensing means and a second part secured to the material receiving means. More preferably the two-part valve is a split butterfly valve.

Preferably the device of the invention is adapted to cause a net inflow of air from the external environment. This lowers the risk of extraneous material reaching the operator working area and breathing zone.

Preferably the device of the invention is adapted to provide a negative pressure differential between the containment chamber and the means for ventilating the chamber. Preferably the device of the invention is adapted to provide a negative pressure differential between the containment chamber and external environment.

Preferably the device of the invention is adapted to minimise turbulence (in order to substantially eliminate particulate suspension and recirculation). Preferably the device of the invention is adapted to provide substantially laminar air flow through the containment chamber thereby essentially eliminating turbulence.

Preferably the means for ventilating the interior of the containment chamber is an exhaust system comprising an elongate exhaust plenum attached to an exhaust outlet. The exhaust outlet may be attached to a filtration means of an acceptable industry standard (e.g., a filtration system providing HEPA quality filtration). Although the exhaust system may comprise one or more exhaust vents at the interface of the elongate exhaust plenum and the containment chamber, the exhaust system preferably has an unrestricted exhaust opening at the interface of the elongate exhaust plenum and the containment chamber. Alternatively the device preferably comprises a perforated exhaust screen at the interface of the exhaust plenum and the containment chamber. Preferably the perforated exhaust screen is arranged to minimise the air flow across the screen. For example, the perforated exhaust screen is arranged such that its face is substantially normal to the air flow.

The elongate exhaust plenum may be secured to the external wall of the containment chamber and extend in an axial or non-axial (e.g., radial) direction (relative to the axis of the containment chamber). Preferably the walls of the elongate exhaust plenum are convergent away from the interface of the elongate exhaust plenum and the containment chamber. The convergence may be stepwise or continuous. In one embodiment, the exhaust plenum has a substantially rectangular pyramidal configuration.

In a preferred embodiment, the containment chamber of the device of the invention comprises a substantially cylindrical body.

Preferably, the substantially cylindrical body terminates at its second end in a truncated cone, wherein the truncated cone is adapted to be seated on or adjacent to the material receiving means.

Preferably, the substantially cylindrical body terminates at its second end in an apertured base plate, wherein the aperture of the apertured base plate is adapted to be seated on or adjacent to the material receiving means. The means for controlling the material flow rate (e.g., a valve) may pass through the aperture and be secured (e.g., bolted) to the base plate.

Preferably, the wall of the containment chamber has a cut-away portion which acts as the air inlet. The cut-away portion may be at or near to the second end of the containment chamber. For example, the cut-away portion may be substantially rectangular. Preferably the cut-away portion is diametrically disposed to the interface of the exhaust plenum and the containment chamber.

In an embodiment of the device of the invention, the whole or a part of the interior wall of the containment chamber is lined by an inner perforated screen. Preferably the inner perforated screen is spaced apart from the interior wall, particularly preferably parallel spaced apart from the interior wall. Preferably the inner perforated screen is arranged to minimise the air flow across the screen. Preferably the inner perforated screen is arranged to optimise the air flow through the screen.

The surface of the inner perforated screen may comprise uniformly or non-uniformly sized perforations. For example, the perforations at or near to the interface of the elongate exhaust plenum and the containment chamber may be of a greater diameter than the perforations elsewhere. Preferably the perforated screen is cut-away at or near to the interface of the exhaust plenum and the containment chamber. Preferably the inner perforated screen exhibits decreased air resistance towards the interface of the exhaust plenum and the containment chamber.

In a preferred embodiment of the device, the external wall of the containment chamber is provided with a port for passing cleaning materials (e.g., wipes) in and out of the containment chamber. Preferably the port is utilised in a bagging technique i.e., soiled cleaning materials are placed in a protective bag fixed to the port and sealed prior to removal.

In an embodiment of the device of the invention, the second end of the containment chamber may be adapted to be seated on the neck of the material receiving means. The device of the invention may be mounted on a lifting arrangement which may be additionally adapted to support the material supply means.

In general, the internal features of the device of the invention are smoothed to assist air flow and reduce powder traps.

The material supply means may be a powder bin of conventional type or any other such arrangement. The material receiving means may be a chemical reaction vessel, mixing machine, sealed packing device or part of a sequential multi-process flow line connection.

It is envisaged that the device of the invention will be used primarily by fine chemical and pharmaceutical product manufacturers. For example, the device could be used in any number of processes including inter alia the seeding of chemical reaction vessels during drug manufacture, the formulation of general chemical compounds and addition of catalysts to chemical processes. The device may be used at both manufacturing and research and development stages since the charging of chemical reactors and drug formulation will become a less hazardous and more reliable step. However, the device will also be of benefit to other manufacturers within the chemical, food and drugs manufacturing industries where potentially toxic materials are transferred (often in very small quantities) between various vessels.

According to a further aspect the present invention, there is provided a material transfer apparatus for transferring material from a material receiving means to a material dispensing means. The apparatus comprises means for controlling the flow rate of material between the material receiving means and the material dispensing means. The apparatus further comprises a device for localized containment of extraneous material at and in the vicinity of the interface between the material receiving means and the material dispensing means. The containment device comprises a containment chamber having a first open end adapted to receive at least a part of the material dispensing means, a second open end adapted to receive at least a part of the material receiving means, and an air inlet. The containment device further comprises means for ventilating the interior of the containment chamber whereby extraneous material at and in the vicinity of the interface between the material receiving means and the material dispensing means is transported to a remote location.

Additional objects and advantages of the invention will be set forth in the description of the preferred embodiments and methods that follows, and in part will be apparent from the description, or may be learned by practice of the invention. The objects and advantages of the invention may be realized and obtained by means of the instrumentalities and combinations pointed out in the appended claims.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings.

DETAILED DESCRIPTION OF PREFERRED EMBODIMENTS AND METHODS OF THE INVENTION

Reference will now be made in detail to the presently preferred embodiments and methods of the invention as described below. It should be noted, however, that the invention in its broader aspects is not limited to the specific details, representative devices and methods, and examples described in this section in connection with the preferred embodiments and methods. The invention according to its various aspects is particularly pointed out and distinctly claimed in the attached claims read in view of this specification, and appropriate equivalents.

The aim of the iterative design modifications between the first, second, third and fourth embodiments was to optimise geometry and inlet velocity to provide a net inflow of air with the minimum of turbulence (the latter being responsible for particulate suspension and recirculation). The air movement and velocity which were achieved allow particulates to be captured and removed to an acceptable degree.

First Embodiment

FIGS. 6(*a*) and 6(*b*) illustrate a first embodiment of the invention designated generally by reference numeral 1. This comprises a cylindrical container 2 having a containment chamber and an inner perforated screen 7 lining the interior wall. A rectangular cut-away portion 3 of the wall of the container acts as an air inlet aperture. An apertured base 13 at the lower end of the container 2 comprises a machined flange shaped to provide a sloping drain to assist with cleaning. A split butterfly valve 4 is substantially centrally disposed through the aperture of the base 13 at the lower end of the containment chamber. The valve is secured to the base by bolts. The exhaust system comprises an elongate exhaust plenum 5, an exhaust outlet 6 and exhaust vents at the interface of the two. The elongate exhaust plenum extends in an axial direction on the exterior wall of the container opposite to the cut away portion 3. Air flow is induced by a fan fitted in-line with the exhaust outlet.

With reference to FIGS. 2(*a*) to 2(*c*), there is illustrated an analysis of the first embodiment of the invention. Generally speaking, the first embodiment displays less than satisfactory air flow characteristics. For example, a turbulent area exists between the inner perforated screen 2 and the wall of the containment chamber causing re-circulation of the air flow 3. Re-circulation interferes with the evacuation of particles through the exhaust system by holding contaminants in suspension. More generally, it will be seen that the air flow in the exhaust plenum 1 is of a very turbulent nature caused by the small exhaust vents 4 between the containment chamber and the exhaust plenum. Jet impingement occurs on the plenum walls and this adds to the turbulence. The overall result is a less than efficient embodiment which indicates that perforated screens parallel to the air flow are generally undesirable.

Figure 1A:
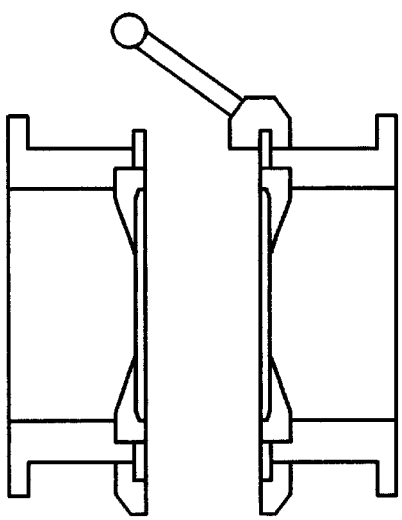
FIGS. 1(a) to 1(c) illustrate a split butterfly valve in various respective stages of operation.
Figure 1B:
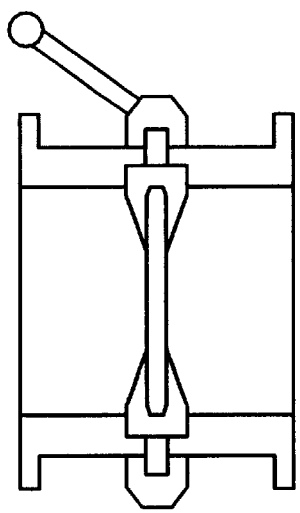
Figure 1C:
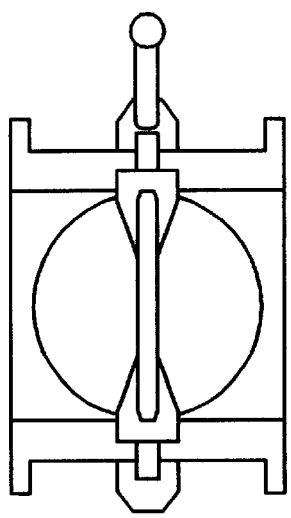
Figure 2A:
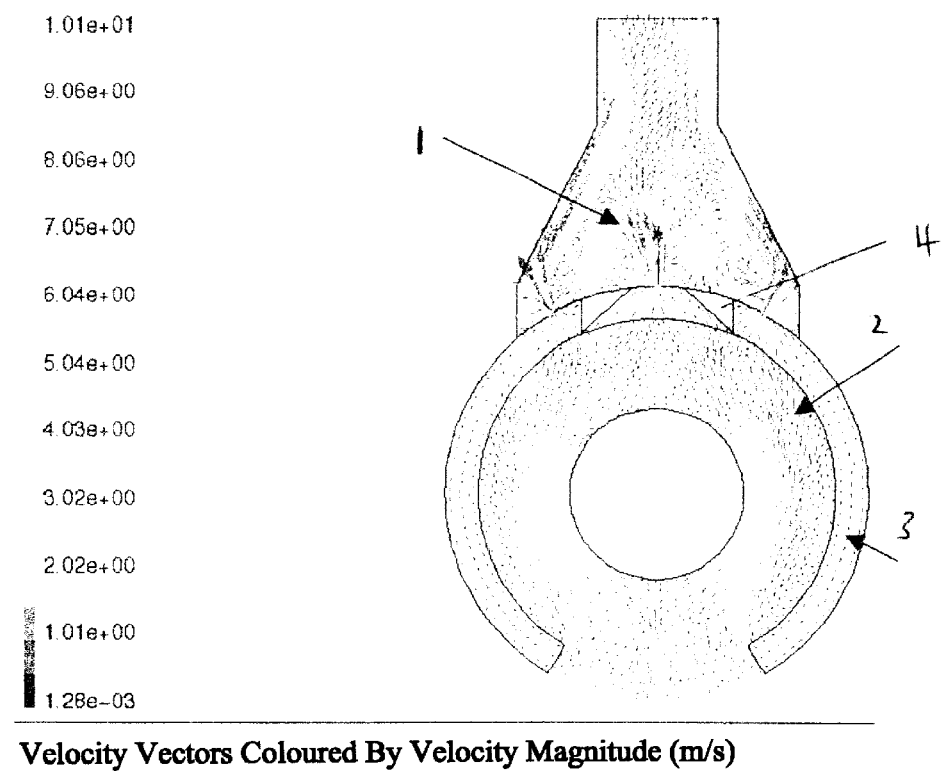
FIGS. 2(a) to 2(c) illustrate air flow analysis, turbulence contours and pressure contours of a first embodiment of the invention using Computer Fluid Dynamics.
Figure 2B:
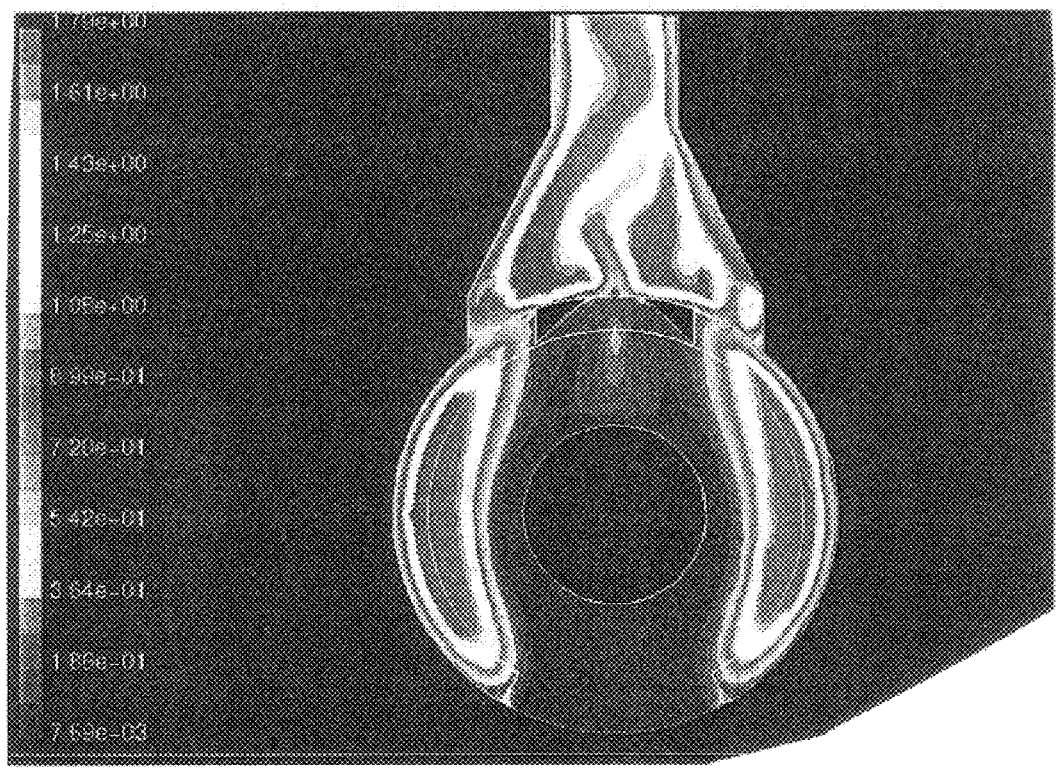

The turbulent intensity is illustrated in the contour plot of FIG. 2(b) and confirms the interpretation of FIG. 2(a). This indicates the turbulent areas adjacent to the sides of the inner perforated screen 2 and the turbulent areas adjacent to the small exhaust vents.

Figure 2C:
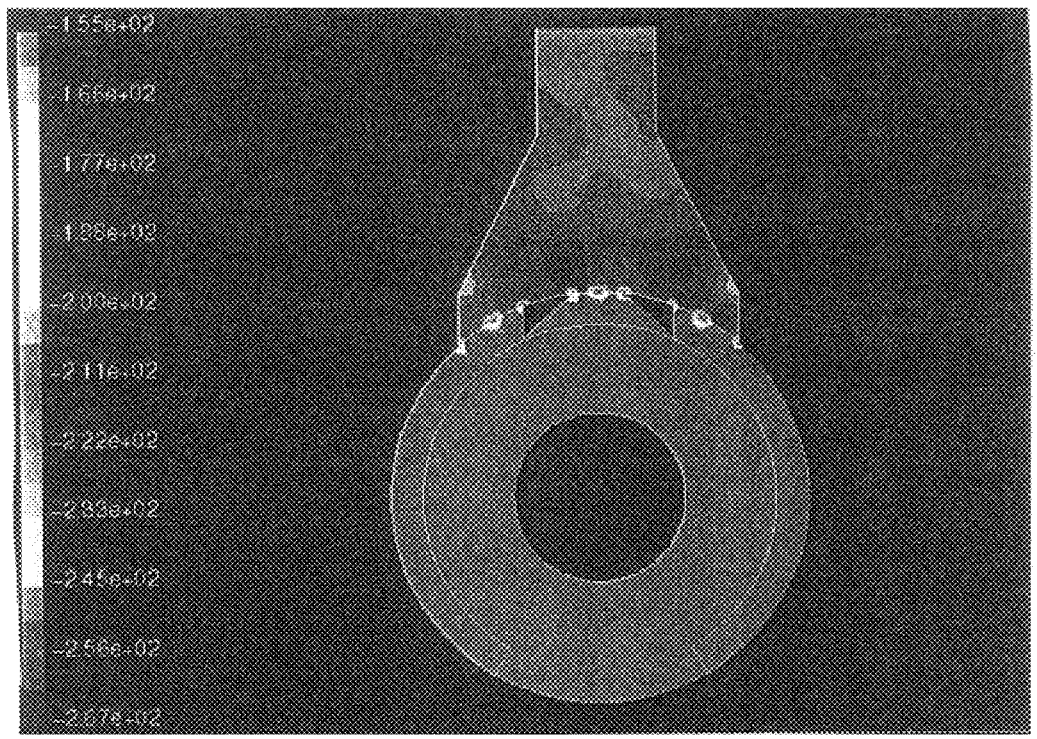

FIG. 2(c) illustrates the contours of static pressure in the device. Relatively high pressure is exhibited in the cylindrical body of the containment chamber and relatively low pressure (approximately 110 Pascals less) across the exhaust vents and into the exhaust plenum. The narrow restrictions created by the small exhaust vents may be responsible for this observation. This behaviour is typical of pressure differences exhibited when a flow restriction is imposed and could be controlled by balancing flow velocities and the resistance of the obstruction. Indeed a pressure drop of this nature could be advantageously used to encourage particulate migration to the exhaust system.

Second Embodiment

Figure 7A:
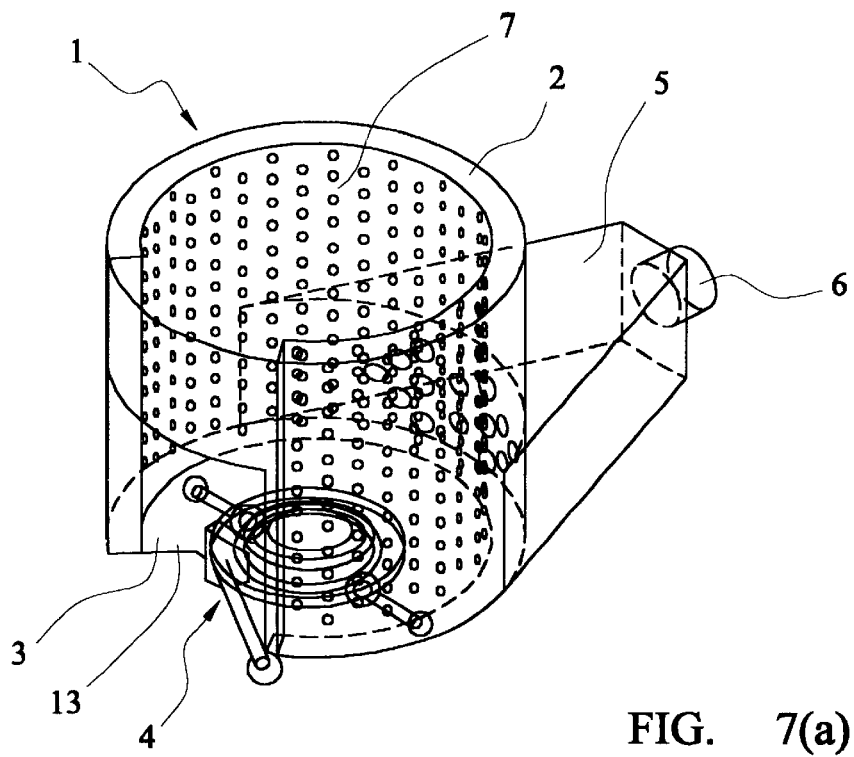
FIGS. 7(a) to (c) illustrate the second embodiment of the invention.
Figure 7B:
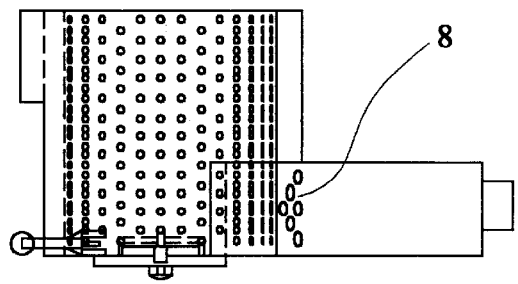
Figure 7C:
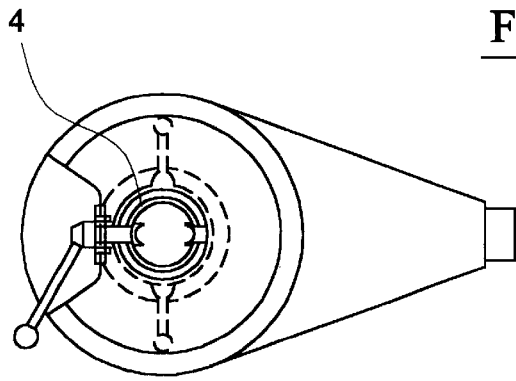

FIGS. 7(a), (b), and (c) illustrate a second embodiment of the invention designated generally by reference numeral 1. This comprises a cylindrical container 2 having a containment chamber with an inner perforated screen 7 lining the interior wall. A rectangular cut-away portion of the wall of the container acts as an air inlet aperture 3. An apertured base 13 at the lower end of the container 2 comprises a machined flange shaped to provide a sloping drain to assist with cleaning. A split butterfly valve 4 is substantially centrally disposed through the aperture of the base 13 at the lower end of the containment chamber.

The valve is secured to the base by bolts. The exhaust system comprises an elongate exhaust plenum 5, an exhaust outlet 6 and a perforated exhaust screen 8 at the interface of the two. The elongate exhaust plenum extends in a radial direction on the exterior wall of the containment chamber opposite to the cut away portion 3. The perforated exhaust screen has perforations of larger diameter than those of the inner perforated screen. Air flow is induced by a fan fitted inline with the exhaust outlet.

Figure 3A:
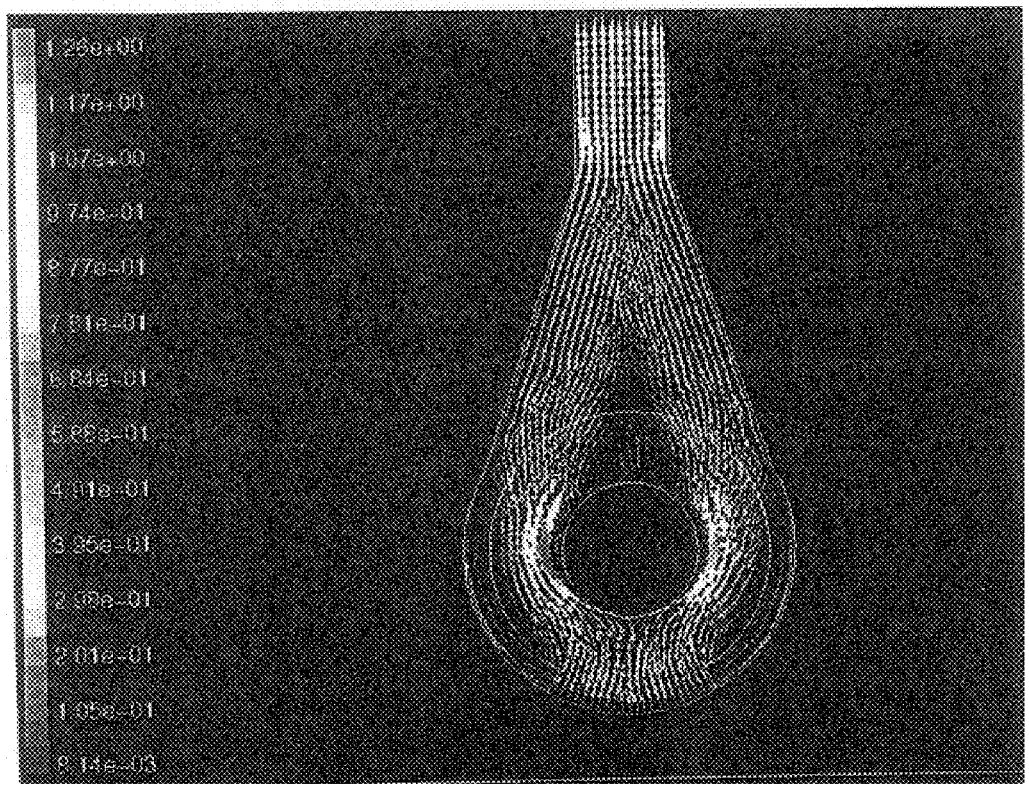
FIGS. 3(a) to 3(c) illustrate air flow analysis, turbulence contours and pressure contours of a second embodiment of the invention using Computer Fluid Dynamics.
Figure 3B:
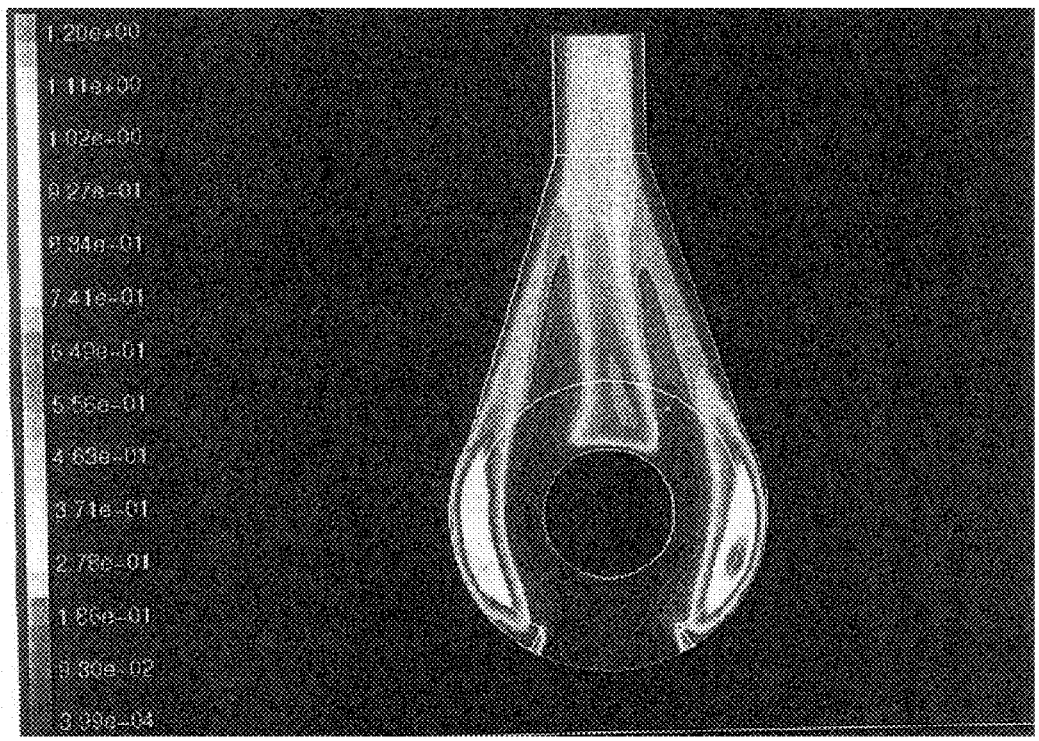
Figure 3C:
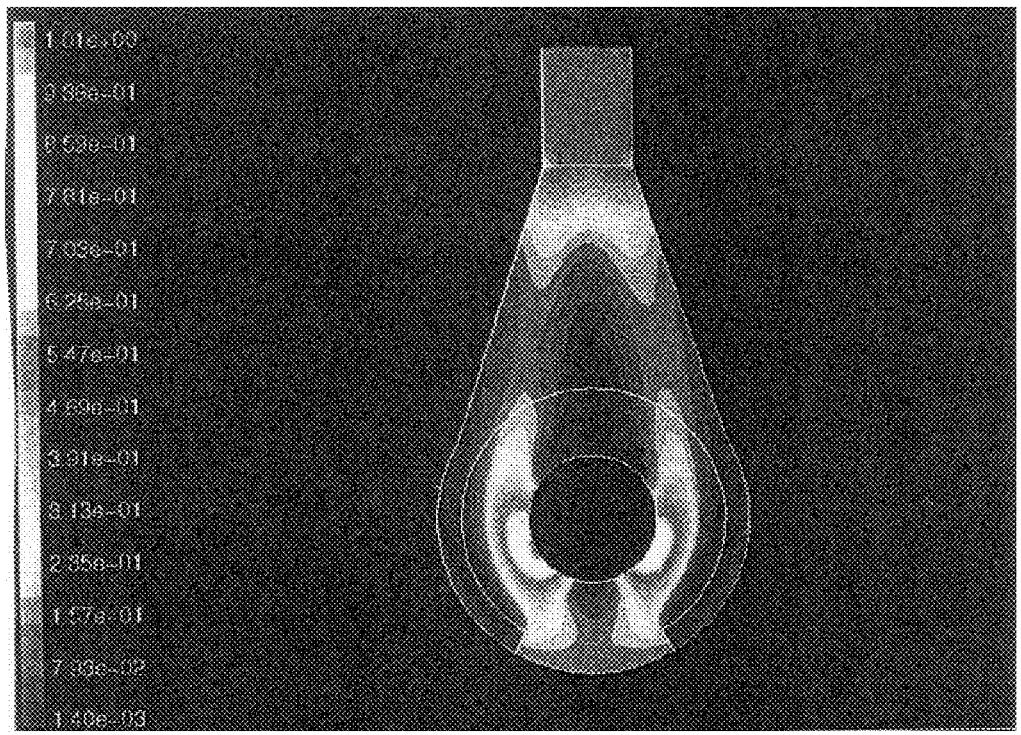

FIGS. 3(a) to 3(c) illustrate an analysis of the second embodiment of the invention which attempts to improve on the efficiency of the first embodiment. Notably, the restriction caused by the small exhaust vents have been removed. Whilst the inner perforated screen has been retained, its resistance has been decreased by increasing the free area ratio (i.e., the relationship between the solid area of the screen and the sum of the areas defined by the perforations). The result is that there is an approximately laminar air flow and the reduction of turbulence will be apparent from FIGS. 3(a) and (b). Nevertheless, turbulence is still evident around the sides of the inner screen and a wake has developed behind the obstruction that represents the split valve and dispensing bottle connection (the blank area in the centre). It will be seen from FIG. 3(b) that high levels of turbulence in the exhaust plenum have essentially been eliminated. Although the inner screen still displays some turbulent properties around the walls of the containment chamber, this is not of the same magnitude as the first embodiment. The turbulent areas at the inlet of the flow domain may be improved by introducing a radiussed profile to assist smooth flow.

With reference to FIG. 3(c), the pressure characteristics are more stable than those displayed by the first embodiment. It will be seen that the entire range of pressure contours differ only by 1 Pascal which can be considered as insignificant. However even at such a low pressure differential, back-flow could be induced and lead to undesirable particulate suspension in the containment chamber.

Third Embodiment

Figure 8A:
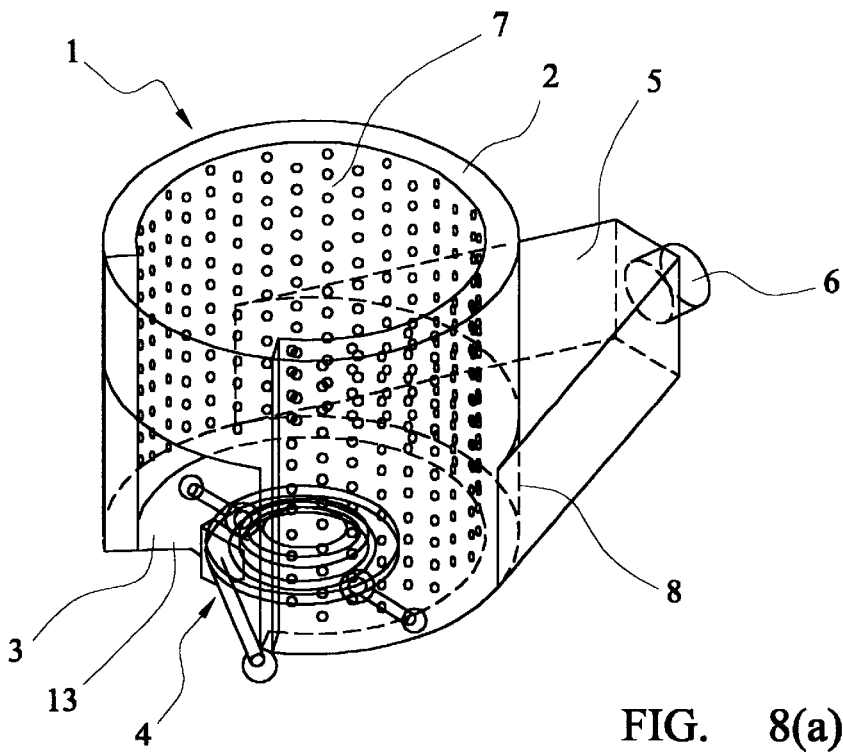
FIGS. 8(a) to (c) illustrate the third embodiment of the invention.
Figure 8B:
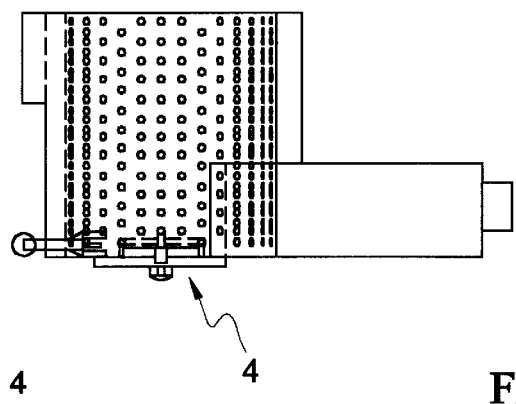
Figure 8C:
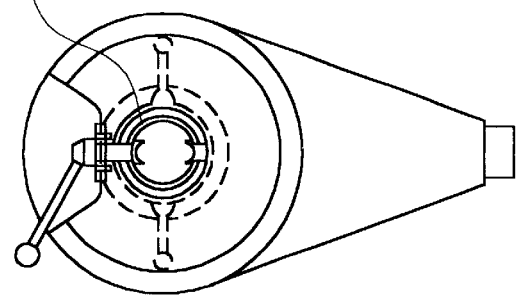

FIGS. 8(a), (b), and (c) illustrate a third embodiment of the invention designated generally by reference numeral 1. This comprises a cylindrical container 2 with an inner perforated screen 7 lining the interior wall. A rectangular cut-away portion of the wall of the container acts as an air inlet aperture 3. An apertured base 13 at the lower end of the containment chamber 2 comprises a machined flange shaped to provide a sloping drain to assist with cleaning. A split butterfly valve 4 is substantially centrally disposed through the aperture of the base 13 at the lower end of the containment chamber. The valve is secured to the base by bolts. The exhaust system comprises an elongate exhaust plenum 5 and an exhaust outlet 6. The elongate exhaust plenum extends in a radial direction on the exterior wall of the containment chamber opposite to the cut away portion 3. The perforated exhaust screen of the second embodiment has been eliminated to leave a zero restriction exhaust opening 8 between the exhaust plenum 5 and the interior of the containment chamber. Air flow is induced by a fan fitted in-line with the exhaust oulet.

Figure 4A:
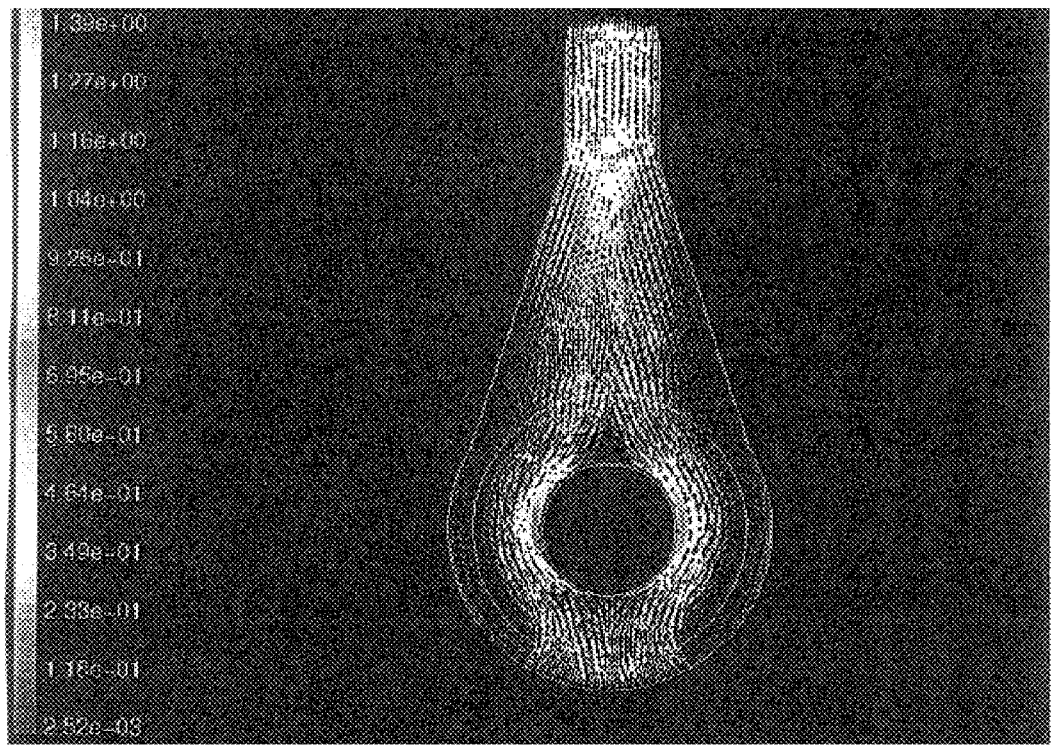
FIGS. 4(a) to 4(c) illustrate air flow analysis, turbulence contours and pressure contours of the third embodiment of the invention using Computer Fluid Dynamics.
Figure 4B:
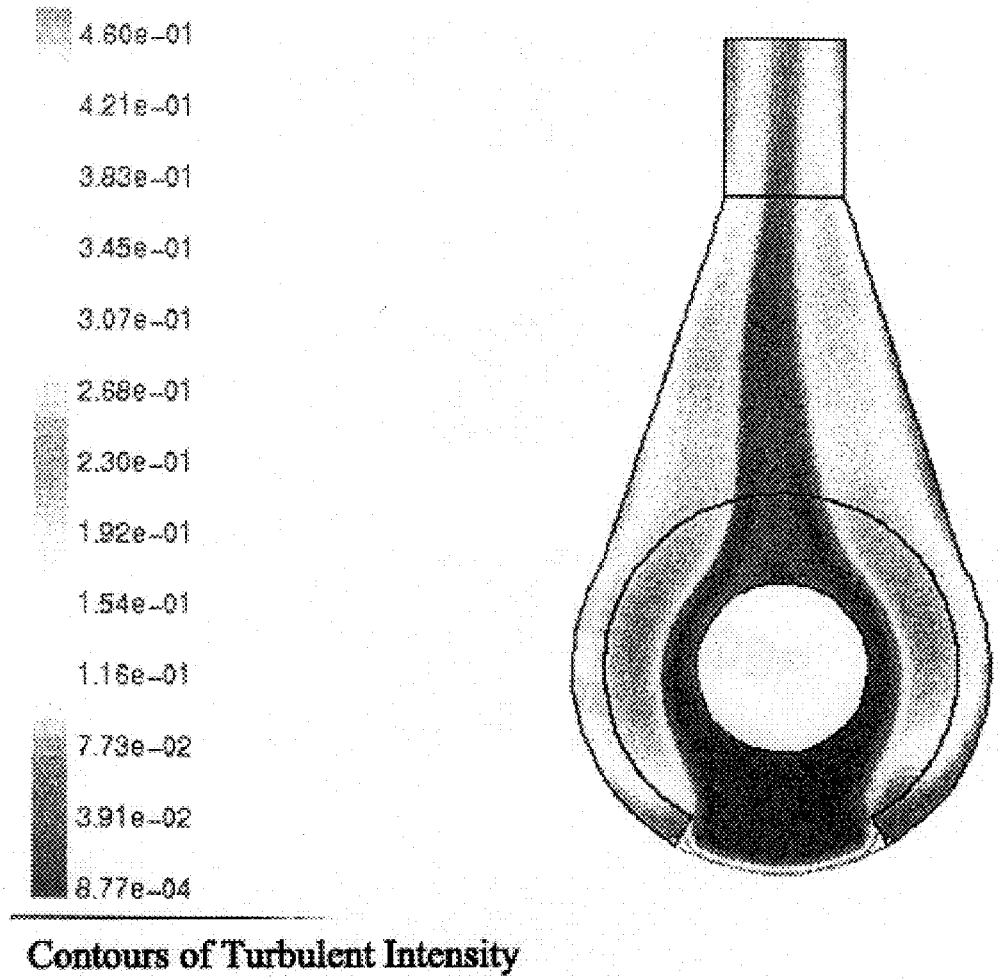
Figure 4C:
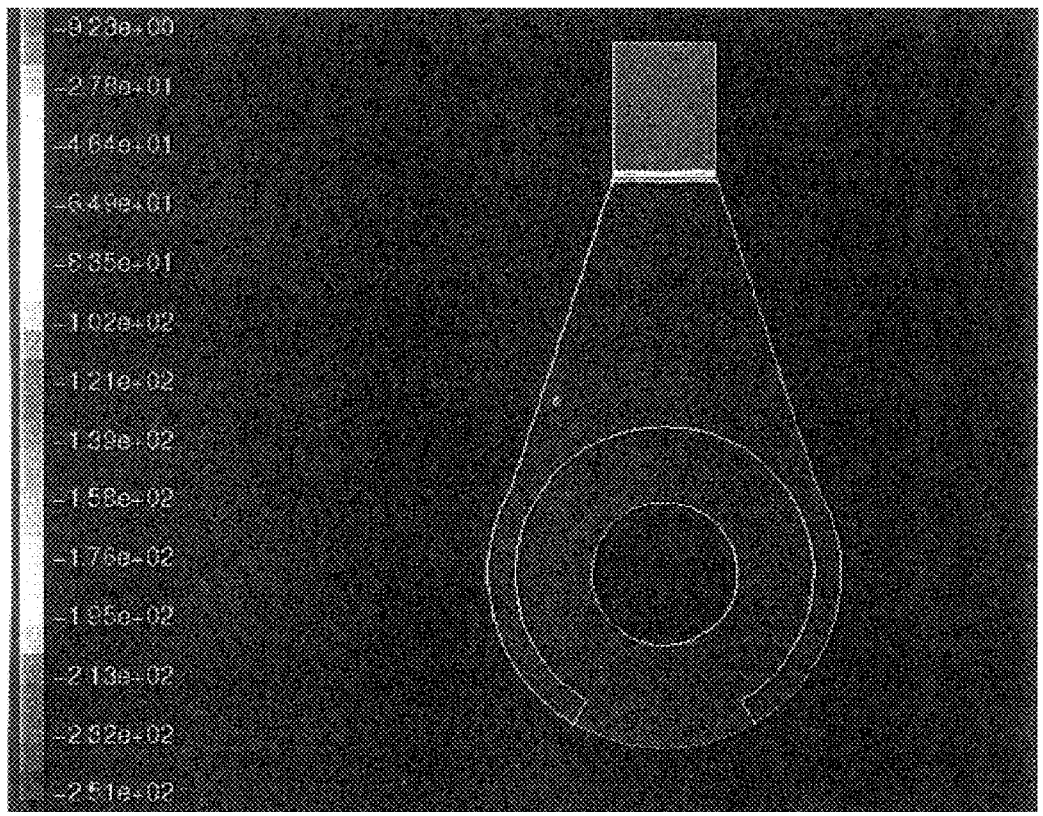

An analysis of the third embodiment illustrated in FIGS. 4(a) to 4(c) shows an improvement on the second embodiment in the sense that the wake to the rear of the obstruction has been reduced. This is achieved by adapting the inner perforated screen to have decreased resistance progressively towards the effected area to the rear of the valve. This has resulted in the shrinkage of the wake and has led to good streamlined flow through the body of the chamber. However this has been at the expense of airflow around the extreme edges of the flow domain. The low velocities at these boundaries will induce turbulence (resulting from drag and reduced pressure induced by the changing velocity profile) which increases progressively towards the boundary walls of the obstruction.

By studying the air flow diagram of FIG. 4(a), it has been possible to use fluid dynamics theory to predict that turbulence would be evident in the low velocity regions adjacent to the boundary walls of the chamber and the inner perforated screen. This is confirmed in FIG. 4(b). However, the overall magnitude of the turbulence intensity is only of the order of 0.45:1. This is relatively insignificant. The turbulence within the containment chamber appears to be caused by the effects of the inner perforated screen and a pressure differential existing across the screen. This is a result of the air flow moving across rather than through the resistance which this feature presents.

The pressure contours of the third embodiment seen in FIG. 4(c) illustrate the differences induced by the changing velocities as the air flows through the chamber. The overall pressure within the device is stable and negative to the external environment in which the device operates. This indicates that the device produces a net inflow of the external air surrounding the device and in turn provides desirable containment characteristics during operation. The pressure differential observed in the exhaust outlet is the result of the progressively increasing velocity as the air flows within the convergent walls of the exhaust outlet and is a desired effect that can be used to advantage in this embodiment.

Fourth Embodiment

Figure 9A:
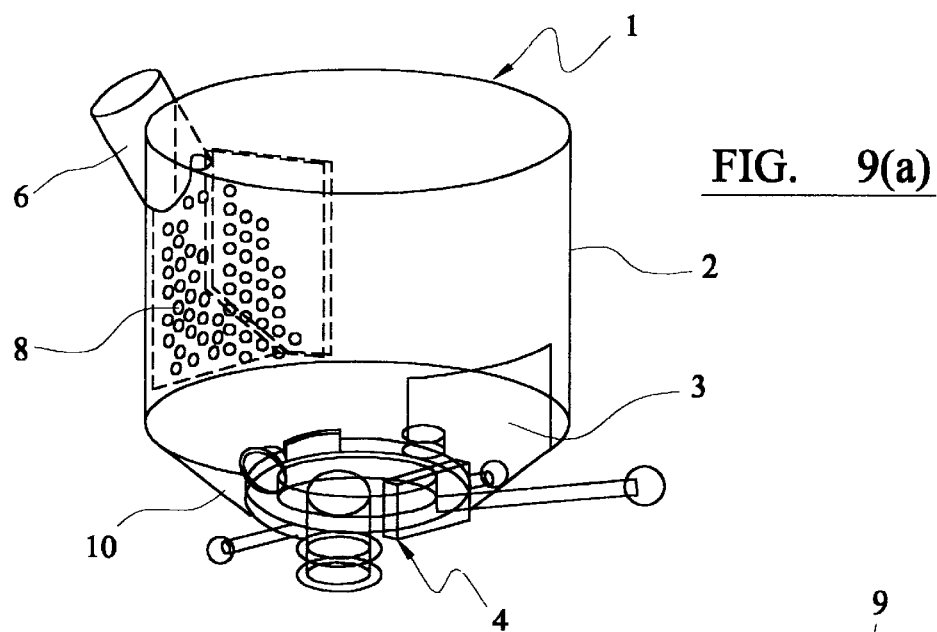
FIGS. 9(a) to (c) illustrate the fourth embodiment of the invention.

FIGS. 9(a), (b), and (c) illustrate a fourth embodiment of the invention designated generally by reference numeral 1. This comprises a cylindrical container 2 which terminates in a truncated cone 10 at its second end and in which a cut-away portion of the wall 3 acts as the air inlet aperture. A split butterfly valve 4 is substantially centrally disposed at the lower end of the containment chamber. The exhaust system comprises an elongate exhaust plenum 5, an exhaust outlet 6 and a perforated exhaust screen 8 at the interface of the two. The elongate exhaust plenum extends in an axial direction on the exterior wall of the containment chamber opposite to the cut away portion 3. The inner perforated screen has been eliminated and the perforated exhaust screen 8 is positioned normal to the air flow. A dispensing bottle 9 (shown in outline) is mounted on the upper end of the containment chamber. Air flow is induced by a fan fitted in-line with the exhaust outlet.

Figure 5A:
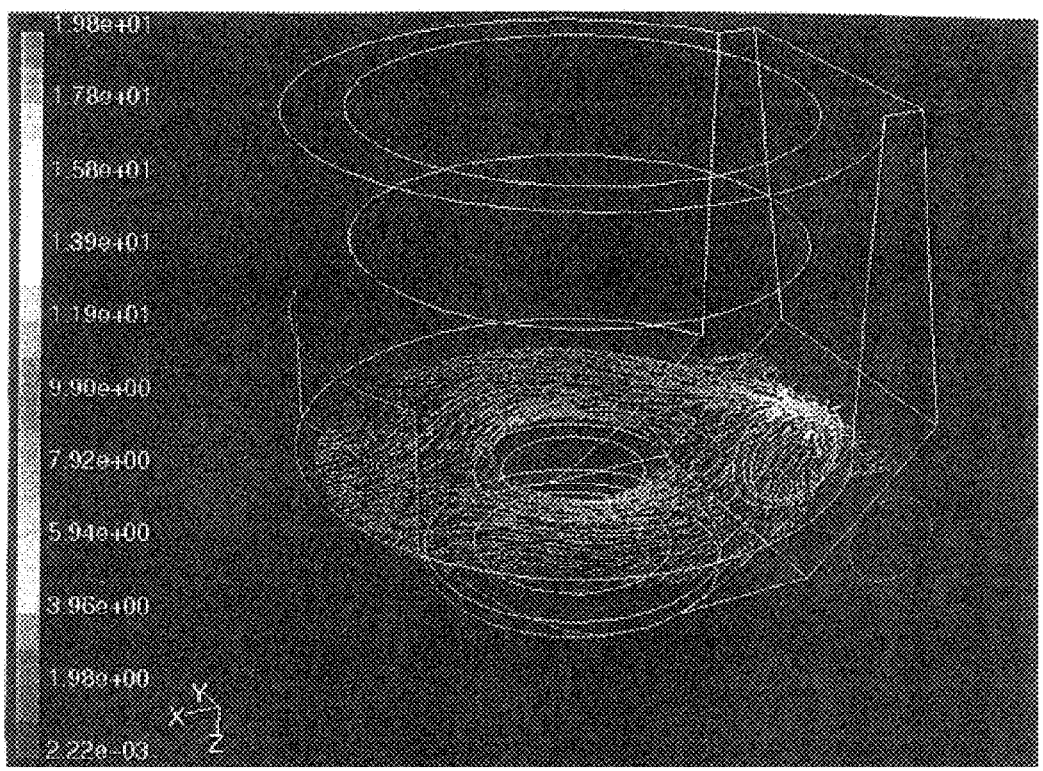
FIGS. 5(a) to 5(c) illustrate air flow analysis, turbulence contours and pressure contours of a fourth embodiment of the invention using Computer Fluid Dynamics.
Figure 9B:
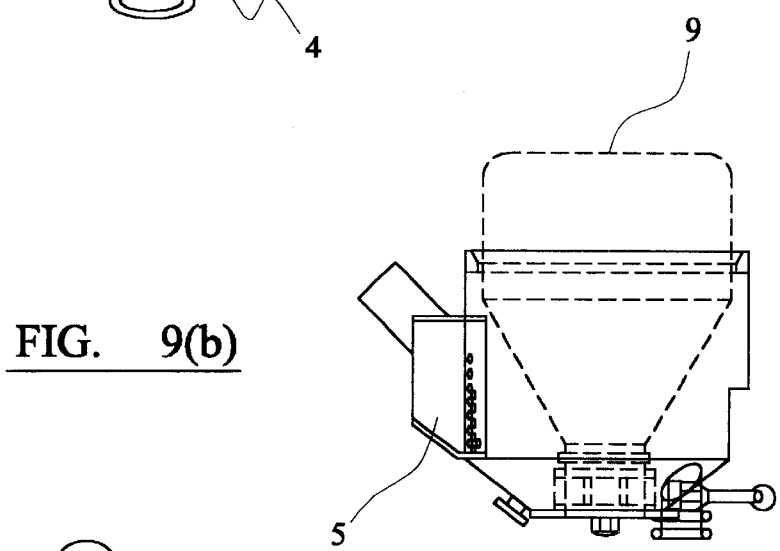
Figure 9C:
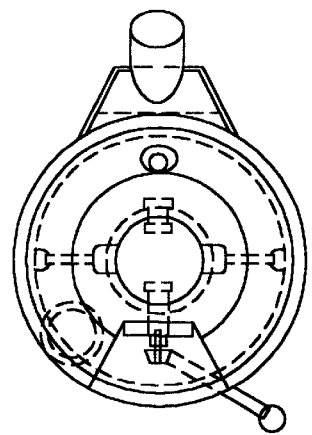

The fourth embodiment illustrated in FIGS. 9(a) to 9(c) has no inner perforated screen. The improved air flow characteristics are immediately evident from the velocity plot shown in FIG. 5(a). The device now exhibits an effective flow of air in the areas of significance, a reduced wake to the rear of the obstruction and an efficient exhaust system that causes the air flow to accelerate through the exhaust plenum. The perforated screen normal to the air flow creates a negative pressure differential between the exhaust chamber and the containment chamber. The advantages of this are evident from FIGS. 5(b) and 5(c).

Figure 5B:
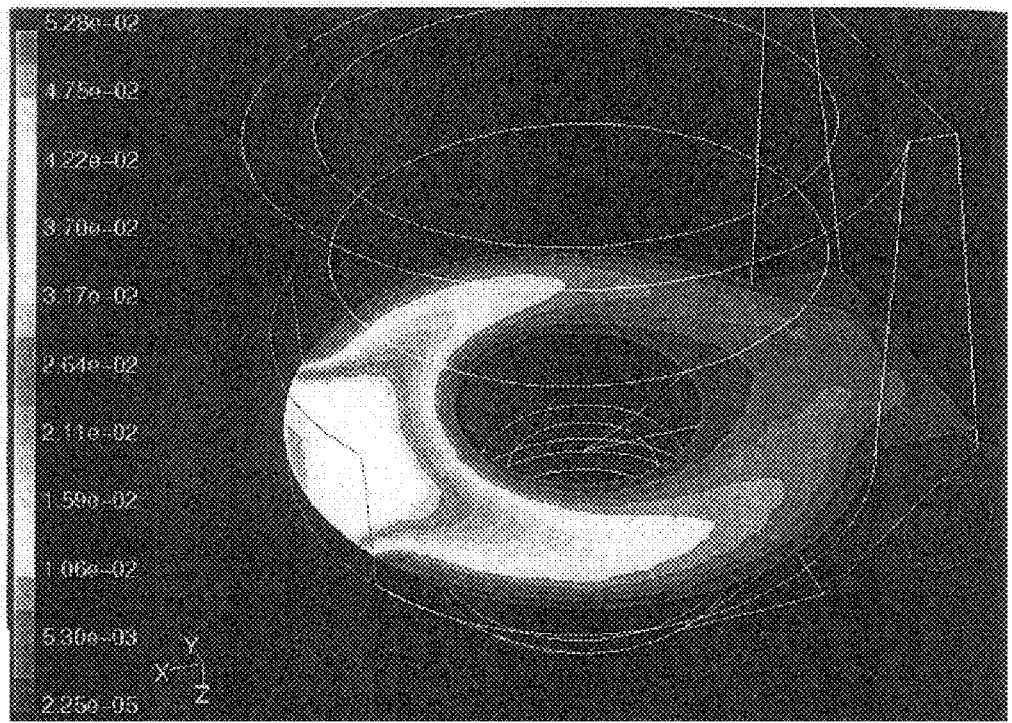

With reference to FIG. 5(b), the highest areas of turbulence occur in the vicinity of the cut-away portion of the wall of the containment chamber. The ratio of the turbulence from the first identifiable change in magnitude is of the order of 0.1:1 and this represents an exceptionally low value. The very low level of turbulence in the critical areas through the centre of the device and around the obstruction indicate laminar flow in these regions which is the condition required for the most efficient evacuation of airborne particulate contaminants.

Figure 5C:
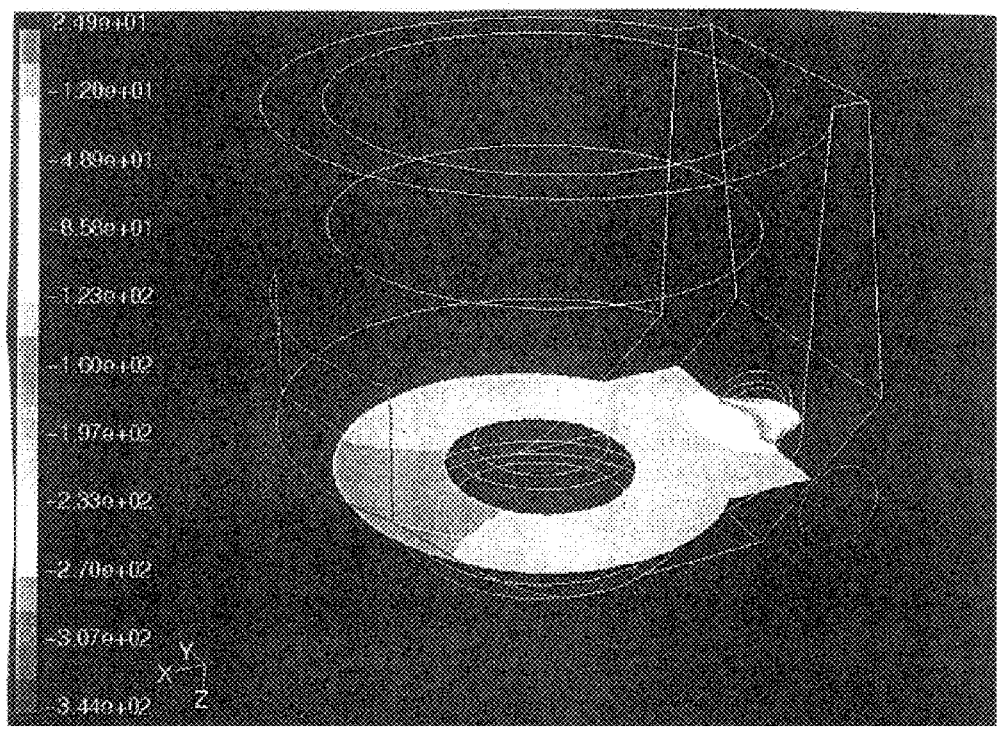
Figure 6A:
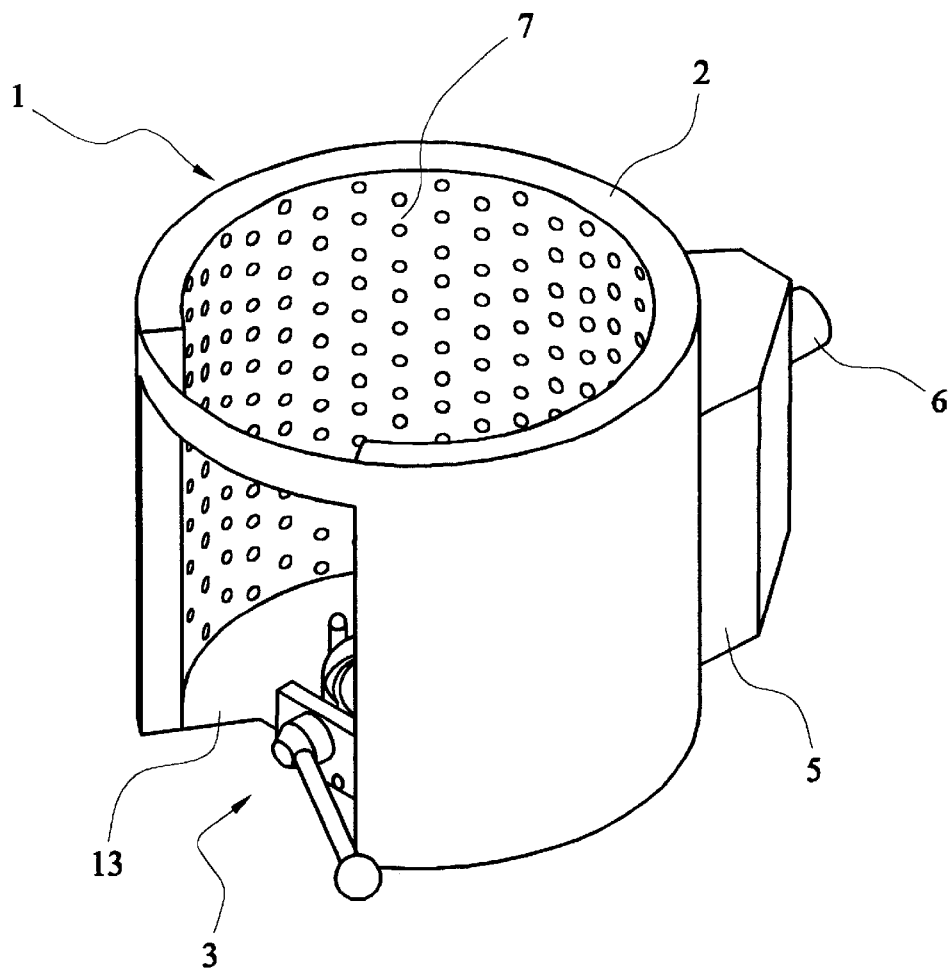
FIGS. 6(a) and 6(b) illustrate the first embodiment of the invention.
Figure 6B:
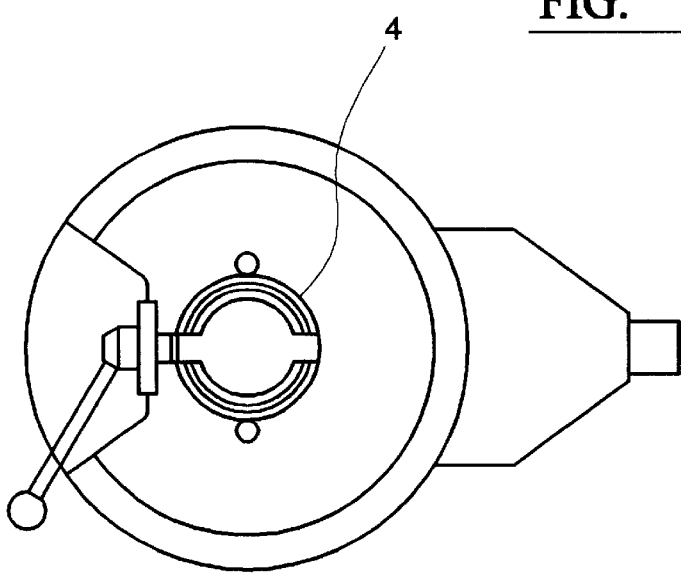

With reference to FIG. 5(c), the pressure contours display a near perfect distribution of pressures. The perforated exhaust screen across the vent to the exhaust plenum has created an effective pressure differential across the boundary of the exhaust and containment chamber. This essentially eliminates the possibility of contaminants being re-circulated from the effects of turbulence. The air flow and any suspended matter are essentially sucked out of the device. Similarly, air flow from the local environment in which the device operates will be sucked in through the cut-away portion of the wall thereby reducing the chances of contaminants reaching the operator working area and breathing zone. Very high levels of containment are expected from this particular embodiment which will have widespread applicability in the pharmaceutical and chemical processing industry.

The foregoing detailed description of the preferred embodiments of the invention has been provided for the purposes of illustration and description, and is not intended to be exhaustive or to limit the invention to the precise embodiments disclosed. The embodiments were chosen and described in order to best explain the principles of the invention and its practical application, thereby enabling others skilled in the art to understand the invention for various embodiments and with various modifications as are suited to the particular use contemplated. It is intended that the scope of the invention cover various modifications and equivalents included within the spirit and scope of the appended claims.

What is claimed is:

1. A device for localized containment of extraneous material at and in the vicinity of an interface between a material receiving means and a material dispensing means, the device comprising:

a container comprising a substantially cylindrical body having a containment chamber, the containment chamber having a first open end adapted to receive at least a part of the material dispensing means, a second open end adapted to receive at least a part of the material receiving means, and an air inlet, wherein the substantially cylindrical body terminates at the second open end in an apertured base plate having an aperture, and wherein the aperture of the apertured base plate is adapted to be seated on or adjacent to the material receiving means; and means for ventilating the containment chamber whereby the extraneous material at and in the vicinity of the interface between the material receiving means and the material dispensing means is transported to a remote location.

2. A device as claimed in claim 1, wherein the means for ventilating is a forced ventilation means for inducing flow of air at and in the vicinity of the interface between the material receiving means and the material dispensing means.

3. A device as claimed in claim 2 wherein the forced ventilation means is selected from the group consisting of:

(a) forced ventilation means for inducing up flow of the air at a velocity capable of carrying the extraneous material with the air flow into a filtration system;

(b) forced ventilation means for inducing down flow of the air at a velocity capable of drawing the extraneous material to a level below that of a typical operators breathing zone; and (c) forced ventilation means for inducing cross flow of the air at a velocity capable of evacuating extraneous material in a horizontal plane.

4. A device as claimed in claim 2, wherein the forced ventilation means is capable of inducing cross flow of the air at a velocity capable of evacuating extraneous material in a horizontal plane.

5. A device as claimed in claim 1, wherein the interface between the material receiving means and the material dispensing means is provided with means for controlling the material flow rate.

6. A device as claimed in claim 5, wherein the means for controlling the material flow rate is positioned at or near to the second open end of the containment chamber.

7. A device as claimed in claim 5, wherein the means for controlling the material flow rate is positioned on or near to a central axis of the containment chamber.

8. A device as claimed in claim 5, wherein the means for controlling the material flow rate is positioned in a plane substantially normal to a central axis of the containment chamber.

9. A device as claimed in claim 8, wherein the plane substantially normal to the central axis of the containment chamber lies at or adjacent to a horizontal plane in which air flow is induced by cross-flow ventilation.

10. A device as claimed in claim 5, wherein the means for controlling the material flow rate comprises a valve.

11. A device as claimed in claim 10, wherein the valve comprises a two-part valve capable of controlling material flow rate between the material dispensing means and the material receiving means.

12. A device as claimed in claim 11, wherein the two-part valve comprises a first part secured to the material dispensing means and a second part secured to the material receiving means.

13. A device as claimed in claim 11, wherein the two-part valve comprises a split butterfly valve.

14. A device as claimed in claim 1, wherein the device is adapted to cause a net inflow of air from the external environment.

15. A device as claimed in claim 1, wherein the device is adapted to provide a negative pressure differential between the containment chamber and the means for ventilating the chamber.

16. A device as claimed in claim 1, wherein the device is adapted to provide a negative pressure differential between the containment chamber and the external environment.

17. A device as claimed in claim 1, wherein the device is adapted to minimize turbulence.

18. A device as claimed in claim 17, wherein the device is adapted to provide substantially laminar air flow through the containment chamber thereby essentially eliminating turbulence.

19. A device as claimed in claim 1, wherein the means for ventilating the interior of the containment chamber comprises an exhaust system comprising:
   an elongate exhaust plenum attached to an exhaust outlet,
      wherein the elongate exhaust plenum is secured to the external wall of the container and extends in an axial or non-axial direction relative to a central axis of the containment chamber.

20. A device as claimed in claim 19 wherein the exhaust outlet is attached to a filtration means.

21. A device as claimed in claim 19, wherein the exhaust system has an unrestricted exhaust opening at the interface of the elongate exhaust plenum and the containment chamber.

22. A device as claimed in claim 19, wherein the exhaust system further comprises a perforated exhaust screen at the interface of the elongate exhaust plenum and the containment chamber.

23. A device as claimed in claim 22, wherein the perforated exhaust screen is arranged to minimize the air flow across the screen.

24. A device as claimed in claim 23, wherein the perforated exhaust screen has a face arranged substantially normal to the air flow.

25. A device as claimed in claim 19, wherein the elongate exhaust plenum extends in a radial direction relative to the central axis of the containment chamber.

26. A device as claimed in claim 19, wherein the elongate exhaust plenum comprises walls that are convergent away from the interface of the elongate exhaust plenum and the containment chamber.

27. A device as claimed in claim 26, wherein the elongate exhaust plenum has a substantially rectangular pyramidal configuration.

28. A device as claimed in claim 1, wherein the container comprises a wall having a cut-away portion that acts as the air inlet.

29. A device as claimed in claim 28 wherein the cut-away portion is at or near to the second open end of the containment chamber.

30. A device as claimed in claim 28 wherein the cut-away portion is diametrically disposed to the interface of the exhaust plenum and the containment chamber.

31. A device as claimed in claim 1, wherein the container comprises a interior wall that is lined in whole or in part by an inner perforated screen.

32. A device as claimed in claim 31 wherein the inner perforated screen is spaced apart from the interior wall.

33. A device as claimed in claim 31 wherein the inner perforated screen is arranged to minimize the air flow across the screen and to optimize the air flow through the inner perforated screen.

34. A device as claimed in claim 31 wherein the inner perforated screen has a surface comprising uniformly or non-uniformly sized perforations.

35. A device as claimed in claim 34 wherein the perforations at or near to the interface of the elongate exhaust plenum and the containment chamber are of a greater diameter than the perforations elsewhere.

36. A device as claimed in claim 31 wherein the inner perforated screen is cut-away at or near to the interface of the exhaust plenum and the containment chamber.

37. A device as claimed in claim 35 wherein the inner perforated screen exhibits decreased air resistance towards the interface of the exhaust plenum and the containment chamber.

38. A device as claimed in claim 37, wherein the second open end of the containment chamber is adapted to be seated on a neck portion of the material receiving means.

39. A device as claimed in claim 1, wherein the material dispensing means is a powder bin.

40. A device as claimed in claim 1, wherein the material receiving means is a chemical reaction vessel, mixing machine, sealed packing device or part of a sequential multi-process flow line connection.

41. A material transfer apparatus for transferring material from a material dispensing means to a material receiving means, the apparatus comprising:
   means for controlling the flow rate of material between the material receiving means and the material dispensing means; and
   a device for localized containment of extraneous material at and in the vicinity of an interface between the material receiving means and the material dispensing means, the device comprising
      a container having a substantially cylindrical body and a containment chamber, the containment chamber having a first open end adapted to receive at least a part of the material dispensing means, a second open end adapted to receive at least a part of the material receiving means, and an air inlet, wherein the substantially cylindrical body terminates at the second open end in an apertured base plate having an aperture, and wherein the aperture of the apertured base plate is adapted to be seated on or adjacent to the material receiving means; and
      means for ventilating the interior of the containment chamber whereby extraneous material at and in the vicinity of the interface between the material receiving means and the material dispensing means is transported to a remote location.

42. A material transfer system comprising:
   a material dispensing means;
   a material receiving means; and
   a device for localized containment of extraneous material at and in the vicinity of an interface between the material receiving means and the material dispensing means, the device comprising a container comprising a substantially cylindrical body having a containment chamber, the containment chamber having a first open end adapted to receive at least a part of the material dispensing means, a second open end adapted to receive at least a part of the material receiving means, and an air inlet, wherein the substantially cylindrical body terminates at the second open end in an apertured base plate having an aperture, and wherein the aperture of the apertured base plate is adapted to be seated on or adjacent to the material receiving means; and means for ventilating the containment chamber whereby the extraneous material at and in the vicinity of the interface between the material receiving means and the material dispensing means is transported to a remote location.

43. A device for localized containment of extraneous material at and in the vicinity of an interface between a material receiving means and a material dispensing means, the device comprising:

a container comprising a containment chamber, the containment chamber having a first open end adapted to receive at least a part of the material dispensing means, a second open end adapted to receive at least a part of the material receiving means, and an air inlet; and means for ventilating the containment chamber whereby the extraneous material at and in the vicinity of the interface between the material receiving means and the material dispensing means is transported to a remote location, wherein the means for ventilating the interior of the containment chamber comprises an exhaust system comprising an elongate exhaust plenum attached to an exhaust outlet, and a perforated exhaust screen at the interface of the elongate exhaust plenum and the containment chamber, and wherein the elongate exhaust plenum is secured to the external wall of the container and extends in an axial or non-axial direction relative to a central axis of the containment chamber.

44. A device as claimed in claim 43 wherein the perforated exhaust screen is arranged to minimize the air flow across the screen.

45. A device as claimed in claim 44, wherein the perforated exhaust screen has a face arranged substantially normal to the air flow.

46. A device for localized containment of extraneous material at and in the vicinity of an interface between a material receiving means and a material dispensing means, the device comprising:

a container comprising a containment chamber, the containment chamber having a first open end adapted to receive at least a part of the material dispensing means, a second open end adapted to receive at least a part of the material receiving means, and an air inlet; and means for ventilating the containment chamber whereby the extraneous material at and in the vicinity of the interface between the material receiving means and the material dispensing means is transported to a remote location, wherein the means for ventilating the interior of the containment chamber comprises an exhaust system comprising an elongate exhaust plenum attached to an exhaust outlet, the elongate exhaust plenum comprising walls that are convergent away from the interface of the elongate exhaust plenum and the containment chamber, and wherein the elongate exhaust plenum is secured to the external wall of the container and extends in an axial or non-axial direction relative to a central axis of the containment chamber.

47. A device as claimed in claim 46 wherein the elongate exhaust plenum has a substantially rectangular pyramidal configuration.

* * * * *